(12) United States Patent
Mohr, IV

(10) Patent No.: US 12,286,002 B2
(45) Date of Patent: *Apr. 29, 2025

(54) TRUCK BED STORAGE SYSTEM

(71) Applicant: MEYNE, LLC, Wellesley, MA (US)

(72) Inventor: Joseph Sutton Mohr, IV, Wellesley, MA (US)

(73) Assignee: MEYNE, LLC, Wellesley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,047

(22) Filed: May 17, 2024

(65) Prior Publication Data
US 2024/0300310 A1    Sep. 12, 2024

Related U.S. Application Data

(63) Continuation of application No. 17/873,534, filed on Jul. 26, 2022, now Pat. No. 12,011,981.

(60) Provisional application No. 63/226,329, filed on Jul. 28, 2021.

(51) Int. Cl.
| | |
|---|---|
| *B60J 7/14* | (2006.01) |
| *B60J 7/16* | (2006.01) |
| *B62D 33/02* | (2006.01) |
| *B62D 33/04* | (2006.01) |
| *B62D 33/08* | (2006.01) |

(52) U.S. Cl.
CPC .............. *B60J 7/141* (2013.01); *B60J 7/1607* (2013.01); *B62D 33/0207* (2013.01); *B62D 33/04* (2013.01); *B62D 33/08* (2013.01)

(58) Field of Classification Search
CPC ....... B60J 7/14; B60J 7/141; B60J 7/16; B60J 7/1607; B60R 9/00; B60R 9/06; B62D 33/0207; B62D 33/04; B62D 33/08
USPC ....................... 296/100.02, 100.17
See application file for complete search history.

(56) References Cited

U.S. PATENT DOCUMENTS

| | | | |
|---|---|---|---|
| 5,056,855 | A | 10/1991 | Moravsky |
| 6,832,798 | B1 | 12/2004 | Krause |
| 8,322,779 | B2 | 12/2012 | Kramer |
| 8,376,437 | B2 | 2/2013 | Edens |
| 9,150,087 | B2 | 10/2015 | Aho et al. |
| 9,403,424 | B2 | 8/2016 | Cortez |
| 9,440,520 | B2 | 9/2016 | Rohr et al. |
| 9,475,371 | B2 | 10/2016 | Labiche |
| 9,540,050 | B2 | 1/2017 | Miller |
| 9,708,014 | B1 | 7/2017 | Ichtchenko |
| 9,713,950 | B1 | 7/2017 | Stoddard, Jr. |
| 9,744,836 | B1 | 8/2017 | Singer |

(Continued)

OTHER PUBLICATIONS

Kuat, "IBEX Truck Bed Rack," 2024 pp. 1-16.

*Primary Examiner* — Jason S Daniels
(74) *Attorney, Agent, or Firm* — Kintner IP, LLC; Mary Frances Ludwig

(57) ABSTRACT

A truck bed storage system provides multiple different use configurations, including a cap, a rack, and a bed cover. Elements of the system are reconfigurable to assemble the different use configurations. The system is easily assembled, reconfigured, or disassembled. The system includes a modular frame which connects to the truck bed and is used in the rack and cap configurations. A bed cover is removably attached to the top of the frame in the cap configuration, and connects to the top of the bed in the bed cover configuration. Removable panels attach to the frame in the cap configuration.

20 Claims, 17 Drawing Sheets

(56) References Cited

U.S. PATENT DOCUMENTS

| | | |
|---|---|---|
| 9,944,154 B2 | 4/2018 | Singer |
| 9,956,857 B1 | 5/2018 | Singer |
| 9,975,501 B1 | 5/2018 | Frederick et al. |
| 10,000,114 B2 | 6/2018 | Rohr et al. |
| 10,005,347 B1 | 6/2018 | Singer |
| 10,046,628 B1 | 8/2018 | Fulton |
| 10,131,287 B1 | 11/2018 | Marino |
| 10,160,299 B2 | 12/2018 | Molinar |
| 10,183,560 B2 | 1/2019 | Sullivan |
| 10,207,650 B1 | 2/2019 | Banegas |
| 10,252,679 B2 | 4/2019 | Singer |
| 10,272,754 B2 | 4/2019 | Johnson |
| 10,399,419 B2 | 9/2019 | Titus |
| 10,414,258 B2 | 9/2019 | Singer |
| 10,457,128 B2 | 10/2019 | Sullivan |
| 10,538,151 B2 | 1/2020 | Sullivan |
| 10,611,219 B2 | 4/2020 | Trinier |
| 10,894,466 B2 | 1/2021 | Kramer |
| 10,940,744 B1 | 3/2021 | Nadeau |
| 11,052,828 B2 | 7/2021 | Huisman |
| 11,084,362 B2 | 8/2021 | Jung |
| 11,260,918 B2 | 3/2022 | Hunt |
| 11,446,993 B2 | 9/2022 | Singer |
| 11,529,853 B2 | 12/2022 | Deckard et al. |
| 11,718,164 B2 | 8/2023 | King |
| 12,011,981 B2 * | 6/2024 | Mohr, IV ............... B62D 33/08 |
| 2008/0174142 A1 | 7/2008 | Pearlman |
| 2010/0327618 A1 | 12/2010 | Soldatelli |
| 2014/0367990 A1 | 12/2014 | Dost et al. |
| 2016/0361982 A1 | 12/2016 | Rohr et al. |
| 2023/0286444 A1 | 9/2023 | Kuschmeader et al. |

\* cited by examiner

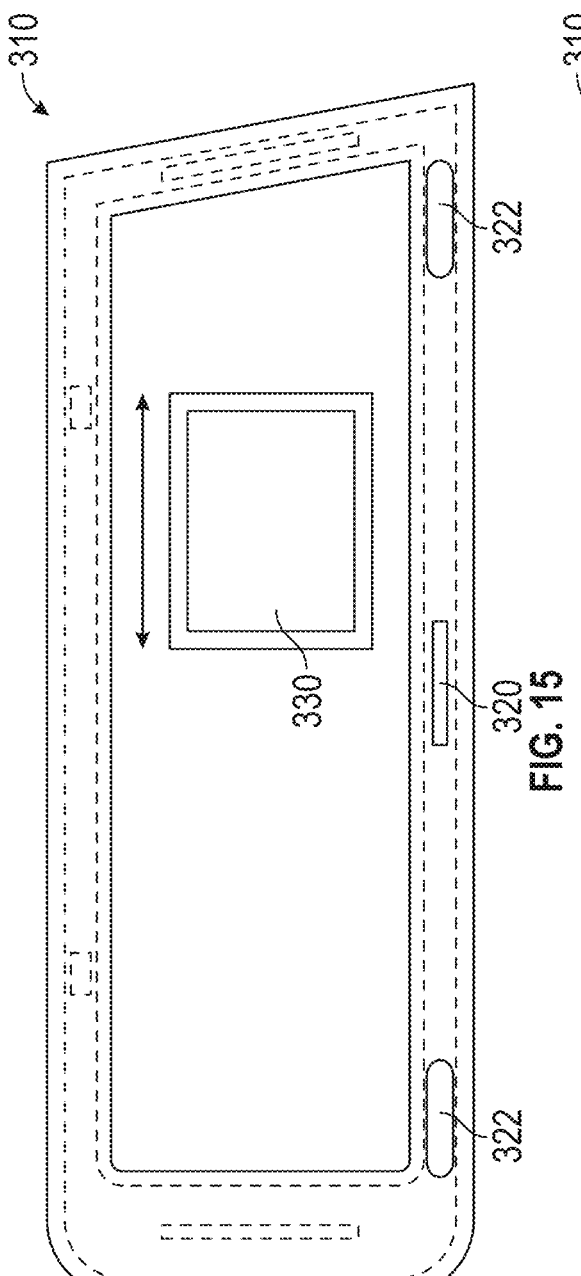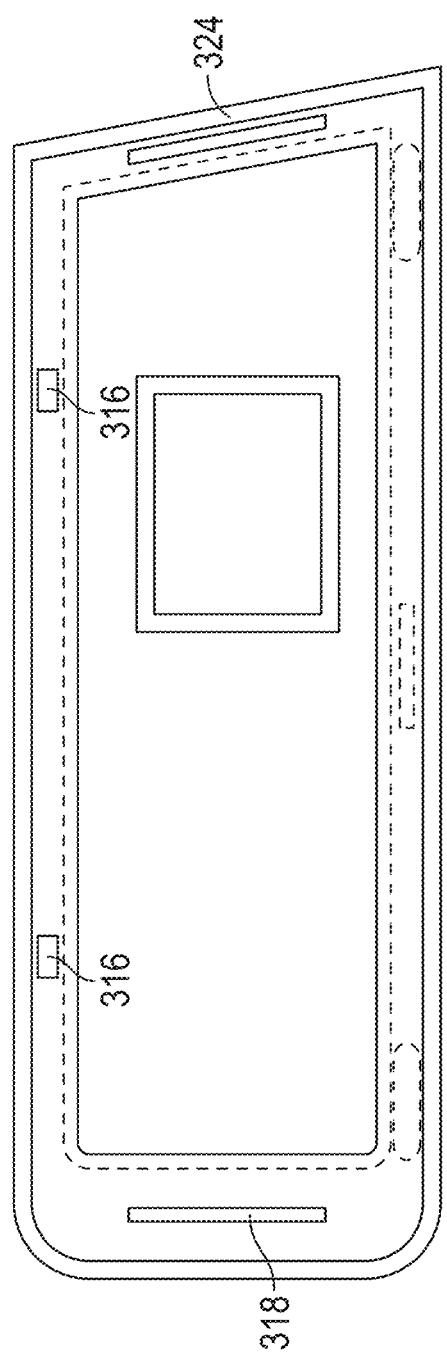

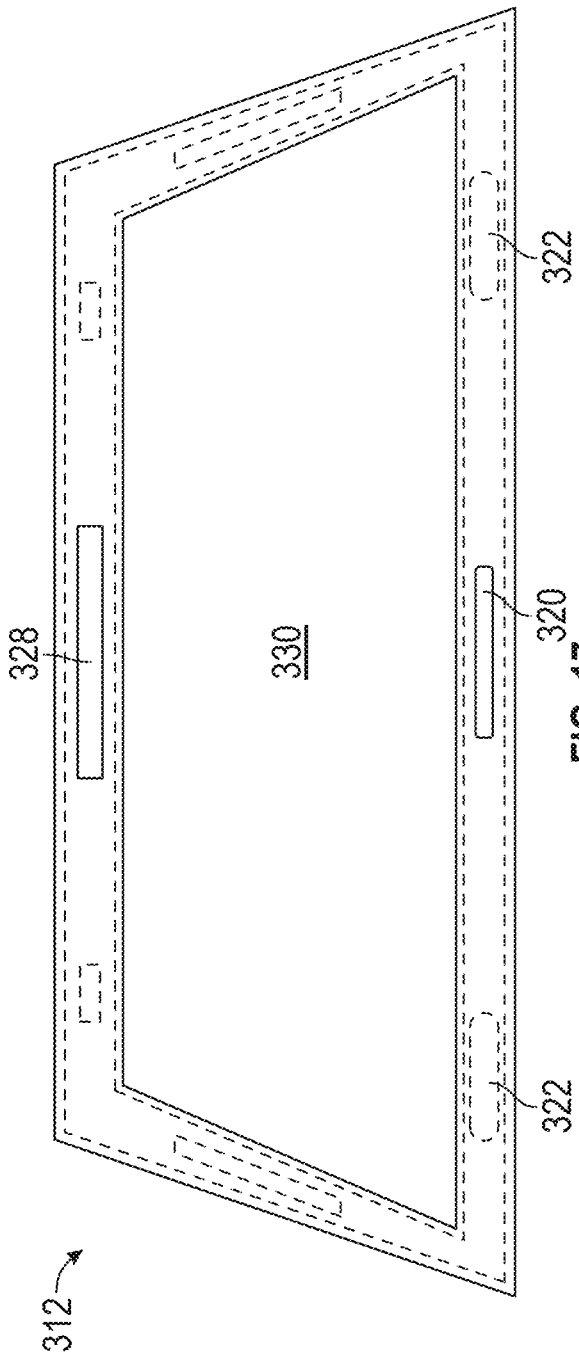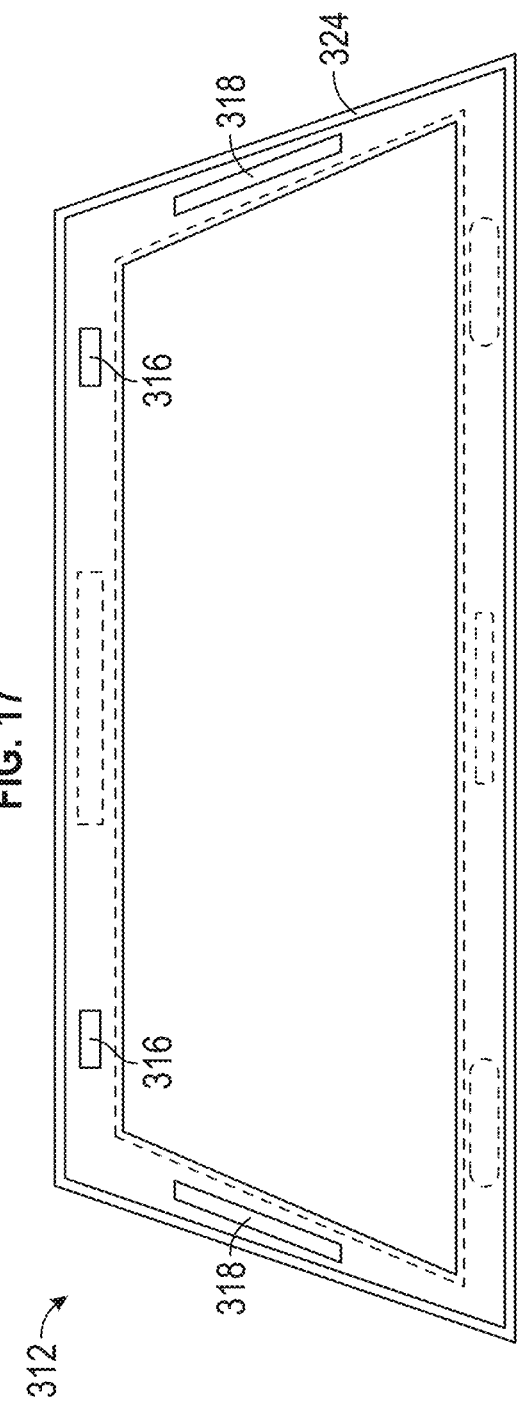

TRUCK BED STORAGE SYSTEM

CROSS REFERENCE TO RELATED APPLICATION

This application is a continuation of U.S. application Ser. No. 17/873,534, filed Jul. 26, 2022, which claims benefit of U.S. Provisional Application No. 63/226,329, filed Jul. 28, 2021, which are both hereby incorporated in their entirety.

BACKGROUND

Devices designed to improve or enhance pickup truck bed storage capability include caps, racks, and bed covers (also referred to as tonneau covers). Caps increase bed storage and provide protection for items within the bed, but may be difficult to install and therefore installation is often semi-permanent. Racks are often used to secure large items, such as ladders or canoes. Racks do not provide protection from the elements, and installation may also be considered semi-permanent. Bed covers are generally removable and protect contents of the bed from the elements. However, bed covers may limit the storage capacity of the bed, restrict access to the bed, and may not provide adequate security when valuable goods are being transported.

With their different capabilities and limitations, one of these storage devices may be more suitable than the others for any particular application. The high cost and impracticality of uninstalling a rack or a cap leads the typical truck owner to choose a single type of storage device, although it may not be suited to all of their various needs.

There is therefore a need for a truck bed storage device which can provide the functionality of a cap, a rack, or a bed cover, without being restricted to a single use configuration.

BRIEF SUMMARY

Embodiments disclosed herein are directed to a truck bed storage system which may be arranged in multiple different use configurations, including a cap, a rack, and a bed cover. The system is modular in that elements of the system are reconfigurable to assemble into the different use configurations. The system is easily assembled, reconfigured, or disassembled. Convenient storage may be provided in the form of a case or bag for storing components which are not in use.

According to one or more embodiments, a storage system cooperates with a truck bed having side walls and a length from front to rear. The storage system includes:
  one or more supports configured to connect to the side walls of the truck bed and extend along the length of the truck bed;
  a modular frame configured for connection to the one or more supports, the frame configurable to a first assembled position having four sides and a top;
  one or more panels, each of the panels removably connectable to one of the four sides of the frame when the frame is in the first assembled position;
  a cover being removably attachable to the top of the frame when the frame is in the first assembled position, and the cover being removably attachable to the one or more supports without being attached to the frame; and
  wherein the storage system is positionable into at least three configurations, the configurations including:
    a cap including the frame configured in the first assembled position, the cover attached to the top of the frame, and the one or more panels each connected to one of the four sides of the frame;
    a rack including the frame configured in the first assembled position; and
    a bed cover including the one or more supports and the cover attached to the one or more supports without being attached to the frame.

According to one or more embodiments of the storage system, the one or more supports include an elongated rail configured to extend substantially along the entire length of the truck bed.

According to one or more embodiments of the storage system, the one or more supports include a retractable support extension; and the cover is removably attachable to the retractable support extension.

According to one or more embodiments of the storage system, the modular frame includes two first frame sections and two second frame sections, each of the first frame sections including an upper cross bar and two legs, and each of the second frame sections including a longitudinal bar. According to one or more embodiments of such a storage system, the legs of the first frame sections are removably connectable to one of the one or more supports. According to one or more embodiments of such a storage system, the cover is removably attachable to one of the upper cross bar or the longitudinal bar of the frame. According to one or more embodiments of such a storage system, the legs of at least one of the two first frame sections are angled inwardly.

According to one or more embodiments of the storage system, each of the one or more panels is removably connectable to at least one of: an upper cross bar and a longitudinal bar of the frame.

According to one or more embodiments of the storage system, at least a portion of the frame is adjustably positionable along a length of the one or more supports.

According to one or more embodiments of the storage system, one or more of the upper cross bars includes at least one of: a mounting hole pattern, a cargo support, a cargo restraint, and a storage component.

According to one or more embodiments of the storage system, the one or more supports include at least one of: a mounting hole pattern, a mounting rail, a connection configured for a cargo support, and a connection configured for a cargo restraint.

According to one or more embodiments, the storage system is positionable into a headache rack configuration including a first frame section including an upper cross bar and two legs, the first frame section configured to be load-bearing and connected to the truck bed without being attached to other components of the frame.

According to one or more embodiments of the storage system, the frame configured in the first assembled position is designed to support at least 150 lbs.

According to one or more embodiments of the storage system, the frame includes one or more longitudinal bars and each of the one or more longitudinal bars are unitarily formed.

According to one or more embodiments of the storage system, the one or more panels are rigid.

According to one or more embodiments, a storage system cooperates with truck bed having side walls and a length from front to rear. The storage system includes:
  one or more supports configured to connect to the side walls of the truck bed and extend along the length of the truck bed;

a modular frame configured for connection to the truck bed, the frame configurable to a first assembled position having four sides and a top;

one or more panels, each of the panels removably connectable to one of the four sides of the frame when the frame is in the first assembled position;

a cover being removably attachable to the top of the frame when the frame is in the first assembled position, and the cover being removably attachable to the one or more supports without being attached to the frame; and wherein the storage system is positionable into at least three configurations, the configurations including:

a cap including the frame configured in the first assembled position, the cover attached to the top of the frame, and the one or more panels each connected to one of the four sides of the frame;

a rack including the frame configured in the first assembled position; and a bed cover including the one or more supports and the cover attached to the one or more supports without being attached to the frame.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the truck bed storage system are described with reference to the following figures, wherein like reference numerals refer to like parts throughout the various views unless otherwise specified.

FIG. 15 is an exterior side view of an embodiment of a side panel of the system.

FIG. 16 is an interior side view of an embodiment of a side panel of the system.

FIG. 17 is an exterior side view of an embodiment of a rear panel of the system.

FIG. 18 is an interior side view of an embodiment of a rear panel of the system.

Figure 1:
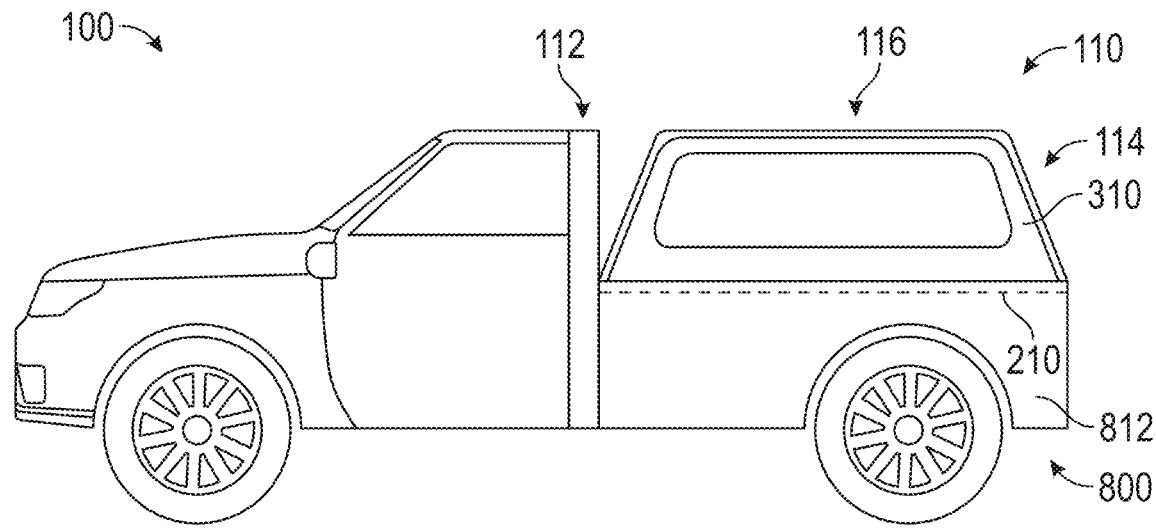
FIG. 1 is a side view of an embodiment of a truck bed storage system in an exemplary use configuration as a cap, the opposite side view being substantially a mirror image.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 100 system
110 frame
   111 upper cross bar
   112 front frame section
   113 longitudinal bar
   114 rear frame section
   116 side frame section
   118 leg
   120 keeper
   122 side of frame
   124 upper frame member
   126 frame joint
   128 leg connection
   130 cover fastener
   140 piston region
   152 channel
   158 frame coupling region
   168 end of frame section
210 support
   212 elongated rail
   214 support extension
   216 brace
   222 upper component
   224 lower component
   226 clamp
   228 corresponding leg connection
   234 corresponding cover fastener
310 side panel
312 rear panel
314 front panel
   316 latch
   318 piston
   320 handle
   322 lock 324 weatherproof seal
326 light
328 camera
330 pane
410 cover
  412 cover fastener
  414 support fastener
  416 extensible section
  418 accessory attachment
510 carrying case
  512 handle
  514 wheel
800 truck bed
  812 side wall
  820 bed interior
  822 ledge
  832 top of side wall

DETAILED DESCRIPTION

Figure 2:
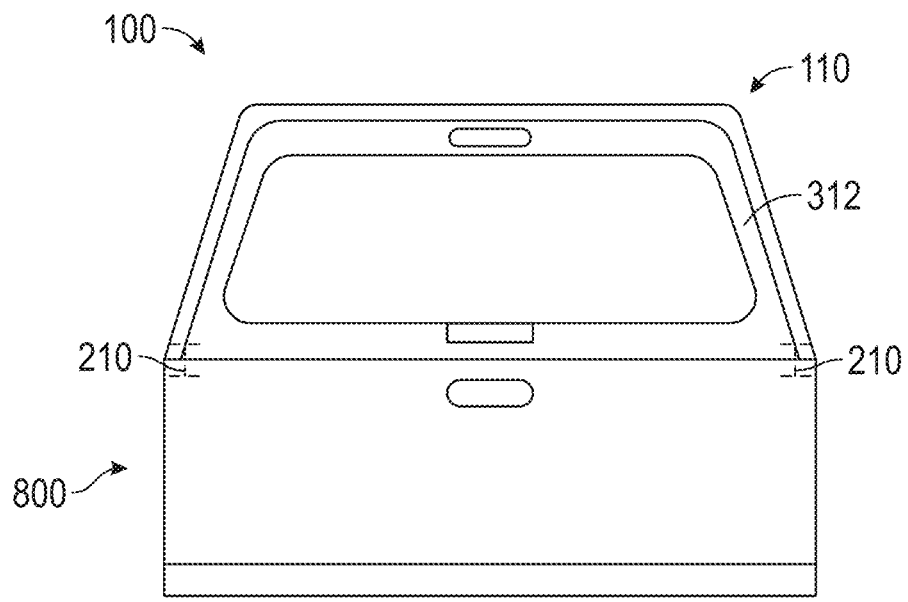
FIG. 2 is a rear view of an embodiment of the system in a cap configuration.
Figure 3:
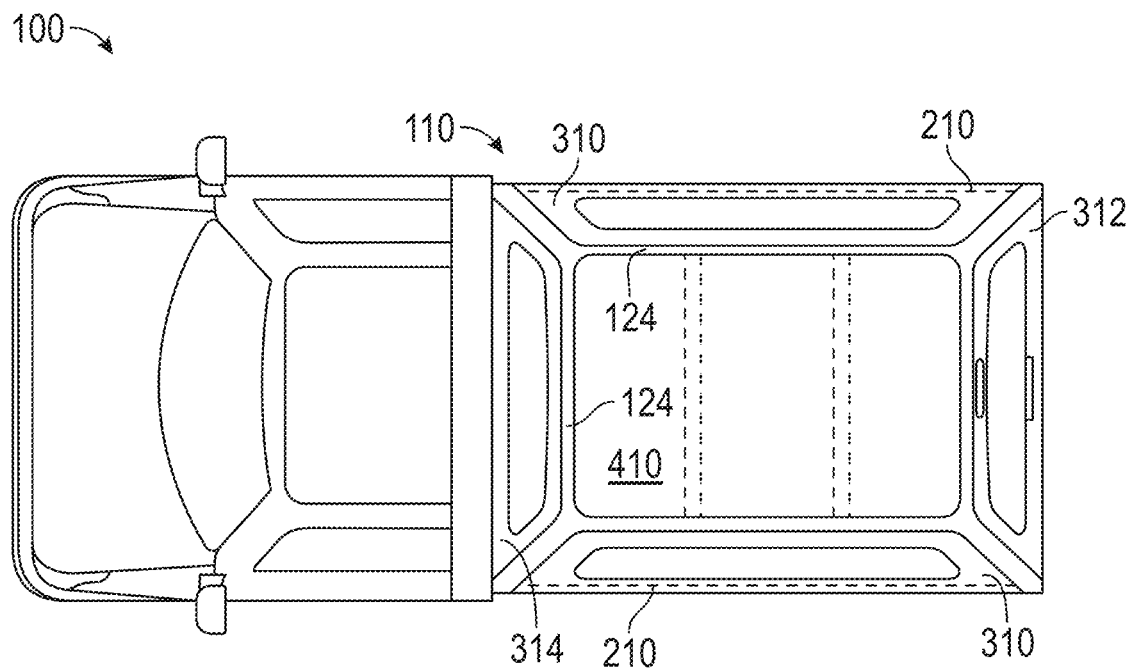
FIG. 3 is a top plan view of an embodiment of the system in a cap configuration.
Figure 4:
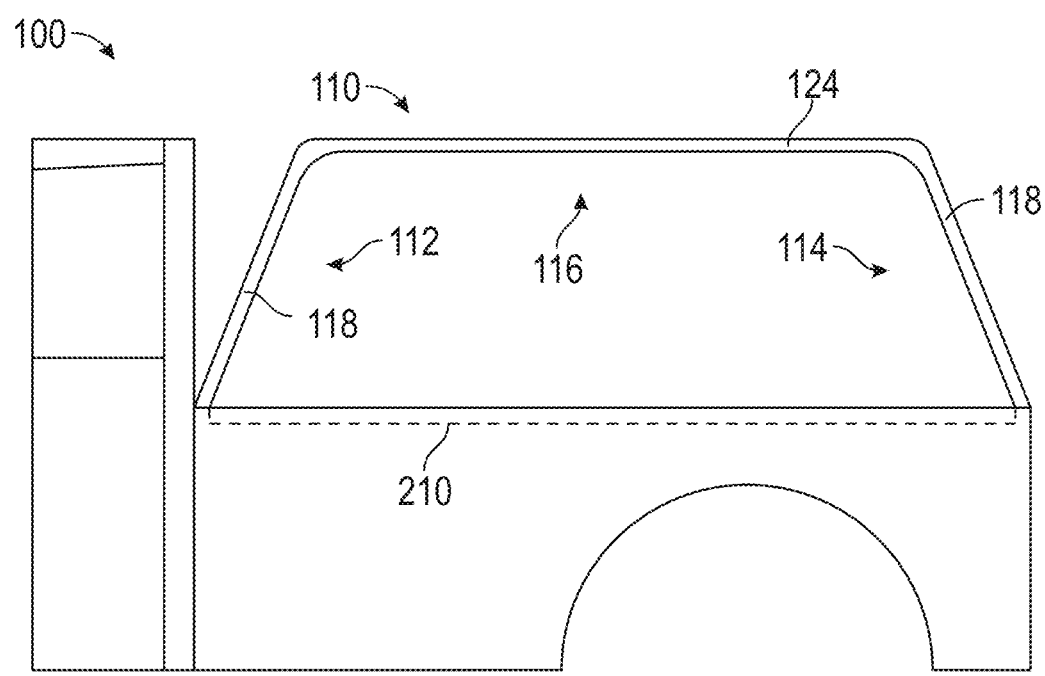
FIG. 4 is a side view of an embodiment of the truck bed storage system in an exemplary use configuration as a rack, the opposite side view being substantially a mirror image.
Figure 5:
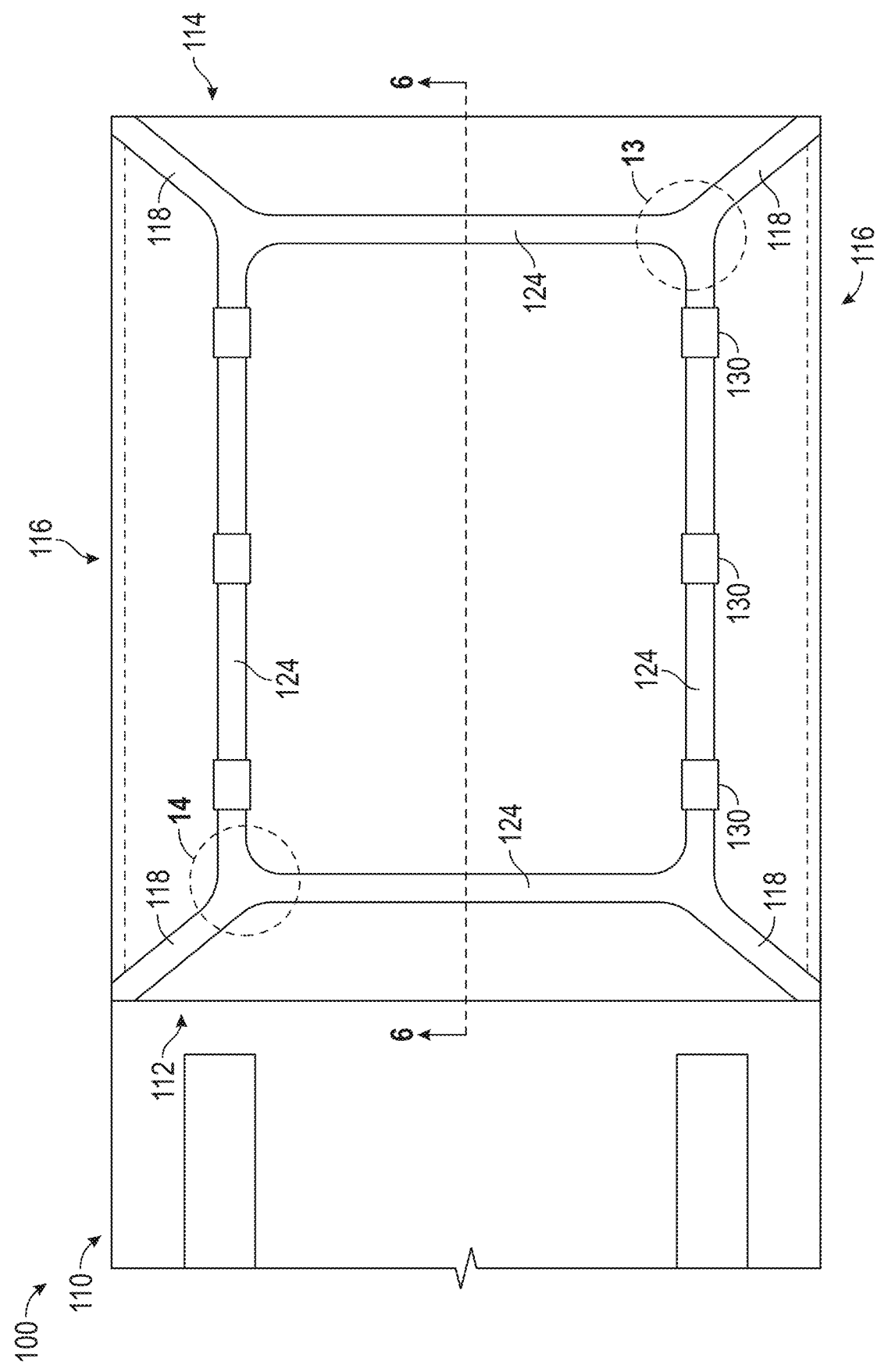
FIG. 5 is a top plan view of an embodiment of the system in a rack configuration.
Figure 6:
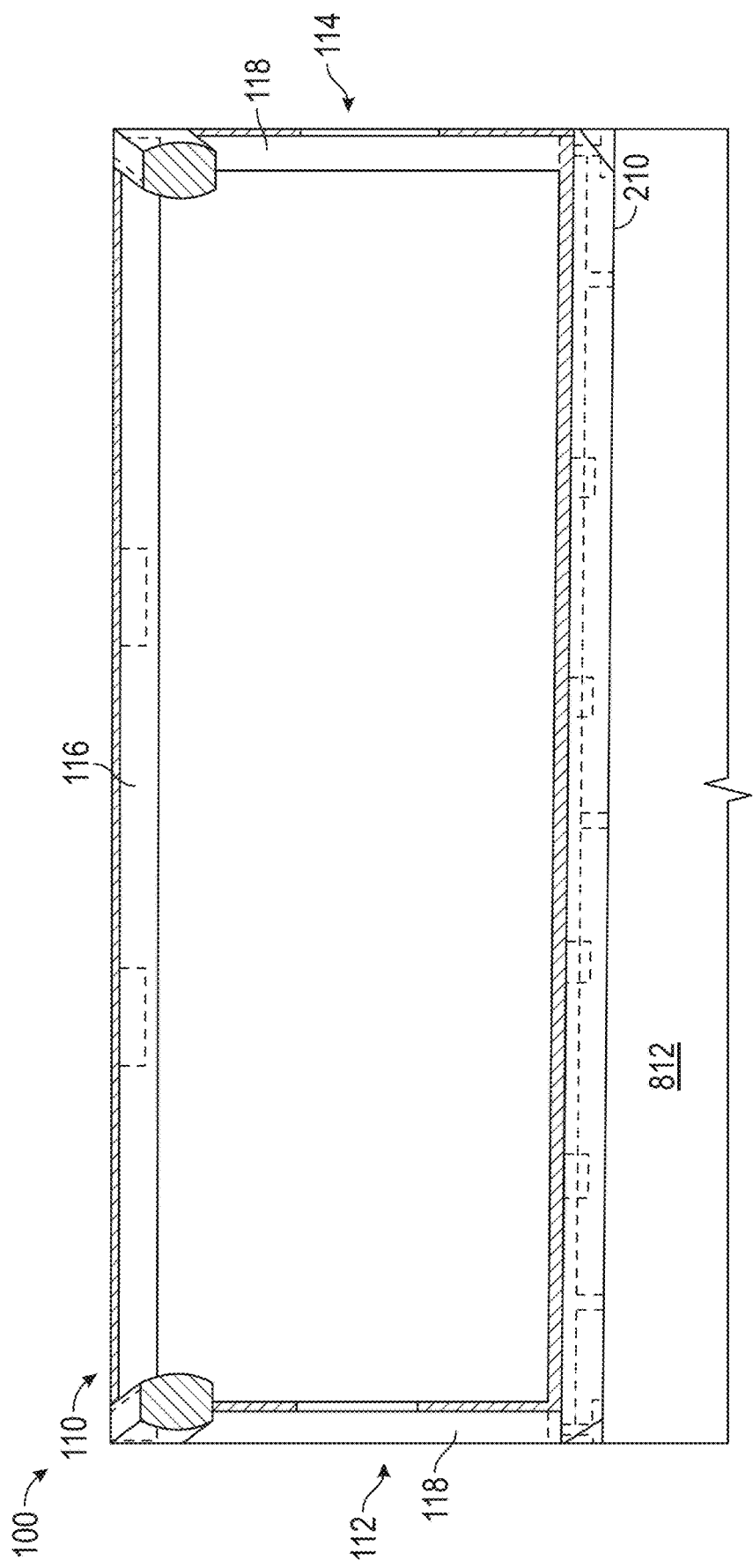
FIG. 6 is a cross-sectional view along line 6-6 of FIG. 5.

Referring initially to FIGS. 1-3, there are illustrated side, rear, and top plan views, respectively, of an embodiment of a truck bed storage system, generally designated as system 100. System 100 is positionable into at least three configurations of use, including a cap, a rack, and a bed cover. In the shown configuration, the system is installed as a cap for a truck bed 800 of a cooperating truck. System 100 includes a frame 110 which may be modular and is configured to connect to truck bed 800. The system may further include one or more panels; for example, in the shown embodiment the system includes four panels: two side panels 310, a rear panel 312, and a front panel 314. Each of panels (e.g., panels 310, 312, 314) is configured for removable connection to frame 110 (e.g., each of the panels may be removably connectable to one of the four sides of frame 110). A cover 410 is configured for removable attachment to the top of frame 110. System 100 includes one or more supports 210, configured to connect to the side walls 812 of the truck bed. In the embodiment of FIGS. 1-3, two supports 210 are installed, one connected to each side wall of the truck bed, and are shown hidden from view (indicated with dashed lines, see also FIGS. 6, 7). Frame 110 may be connected directly to truck bed 800 or may be connected to the one or more supports.

As used in this application, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

FIGS. 4-7 illustrate side, top, cross-sectional, and exploded views, respectively, of an embodiment of system 100 configured for use as a rack. In general, when configured for use as a rack, the system includes components of frame 110. Frame 110 may be arranged in a first assembled position which has four sides and a top. In the rack configuration frame 110 may be connected to supports 210 as shown.

Figure 8:
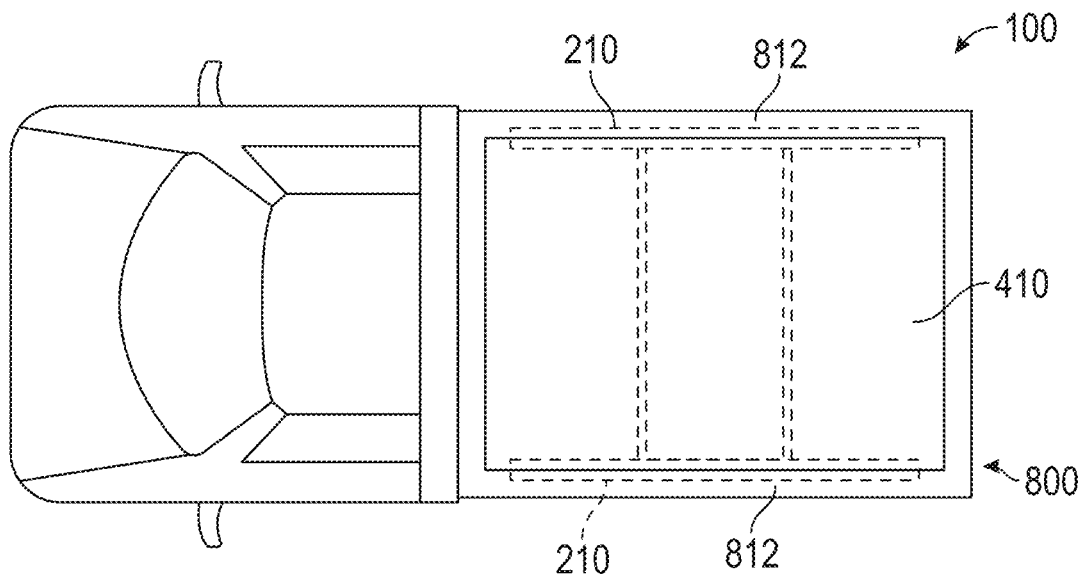
FIG. 8 is a top plan view of an embodiment of the truck bed storage system in an exemplary use configuration as a bed cover.
Figure 9:
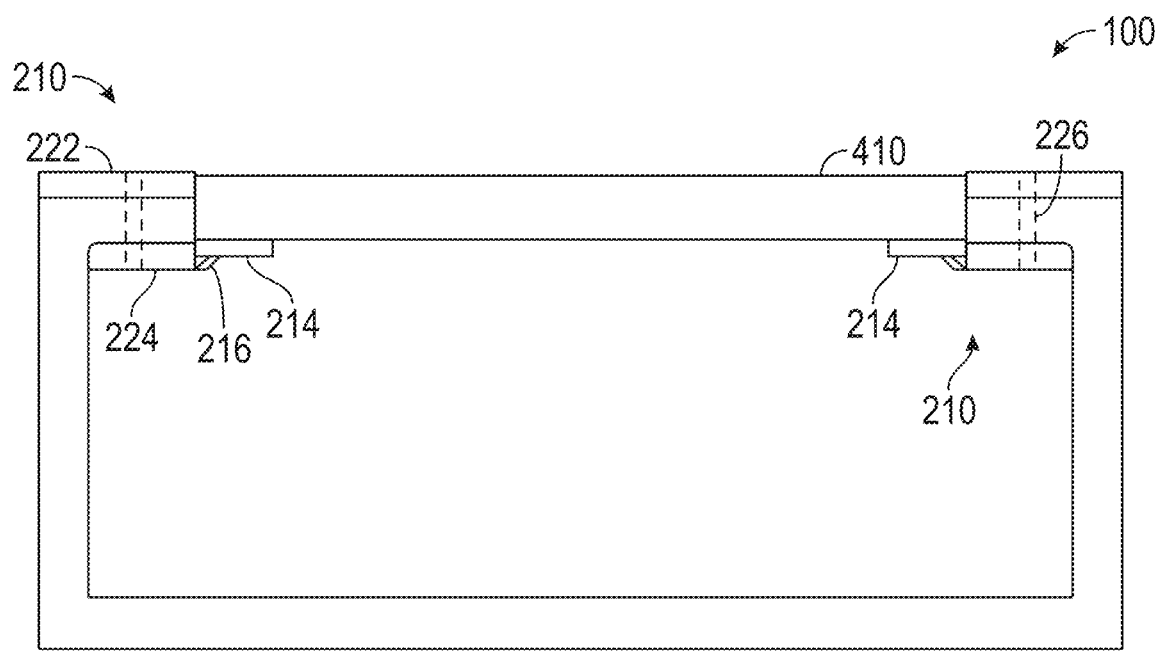
FIG. 9 is a rear view of an embodiment of the system in a bed cover configuration.

FIGS. 8 & 9 are top plan and rear views, respectively, of an embodiment of system 100 configured for use as a bed cover or tonneau cover. In general, when used as a bed cover, the system includes one or more supports 210 and cover 410. Cover 410 may be configured for removable connection to supports 210 or truck bed 800. Typically, when used as a bed cover, cover 410 is not attached to the frame of system 100 (which may be stored or otherwise detached from truck bed 810).

Figure 10:
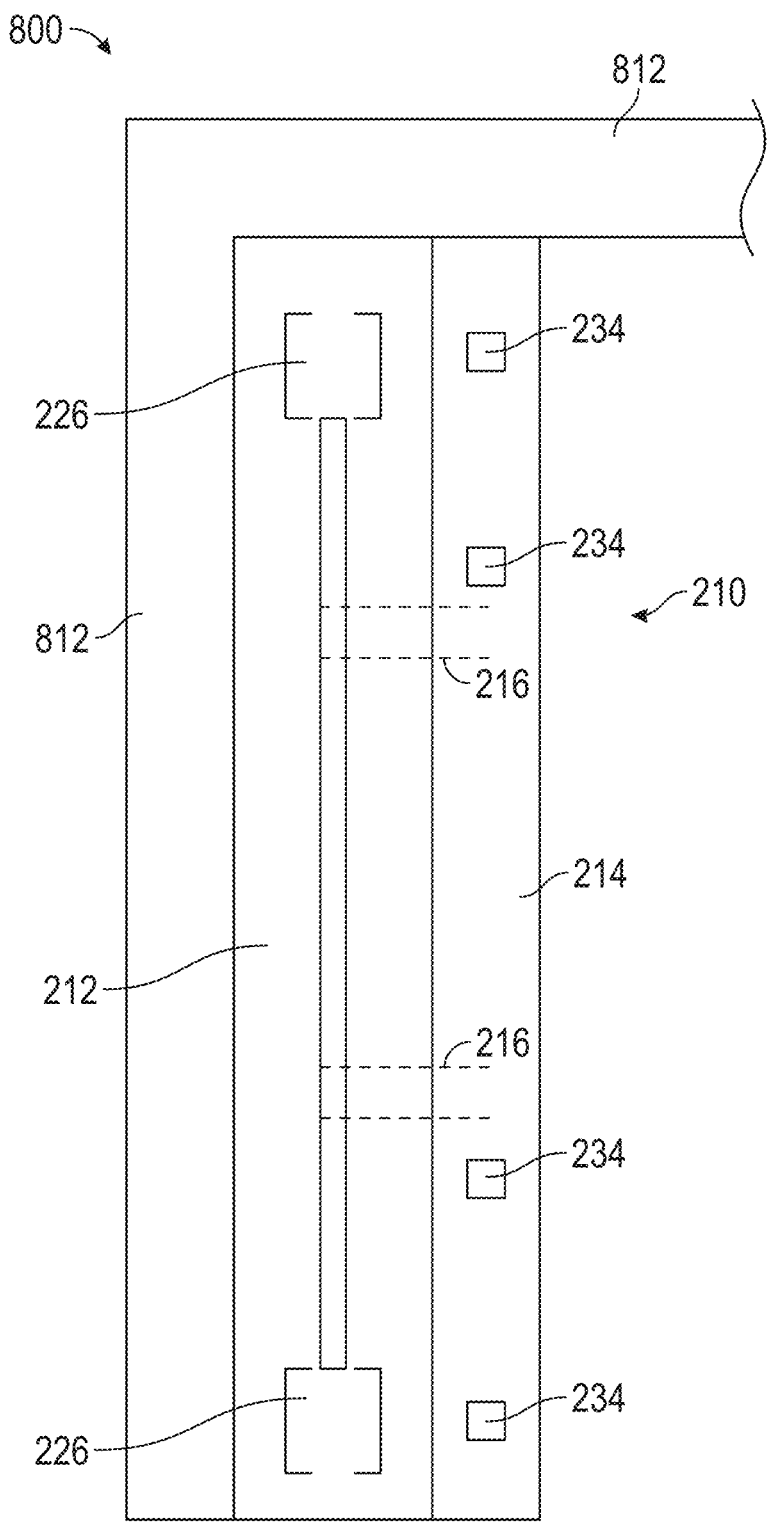
FIG. 10 is a top plan view of an embodiment of a support of the truck bed storage system.

An embodiment of support 210 is shown in the top plan view of FIG. 10. Support 210 includes an elongated rail 212 which extends along the length of truck bed 800 (the length of the truck bed being the dimension extending from the front to the rear of the truck). In some embodiments, elongated rail 212 may extend substantially along the entire length of the truck bed. In the shown embodiment, elongated rail 212 is connected to side wall 812 of truck bed 800, and extends toward the interior of the bed. Support 210 may be substantially flush with the top of side wall 812, or may extend above the height of side wall 812. In other embodiments, elongated rail 212 may connect to the top of side wall 812. Several embodiments of support 210 are shown connected to truck bed 800 in the detail views of FIGS. 11A-11D.

Elongated rail 212 may connect to the side walls of the truck bed via a bolt and corresponding retainer, a clamp, or another type of fastener. In some embodiments, elongated rail 212 may connect to the interior of a side wall of the truck bed. In other embodiments, elongated rail 212 may include several components configured to wrap around a ledge 822 of a side wall which extends toward the interior of the truck bed. In this example, shown in FIG. 11A, elongated rail 212 includes an upper component 222, a lower component 224, and a clamp 226 or other connection mechanism fastening upper component 222 to lower component 224. Multiple clamps 226 may be spaced apart along the length of elongated rail 212 (see, e.g., FIG. 10).

Figure 11A:
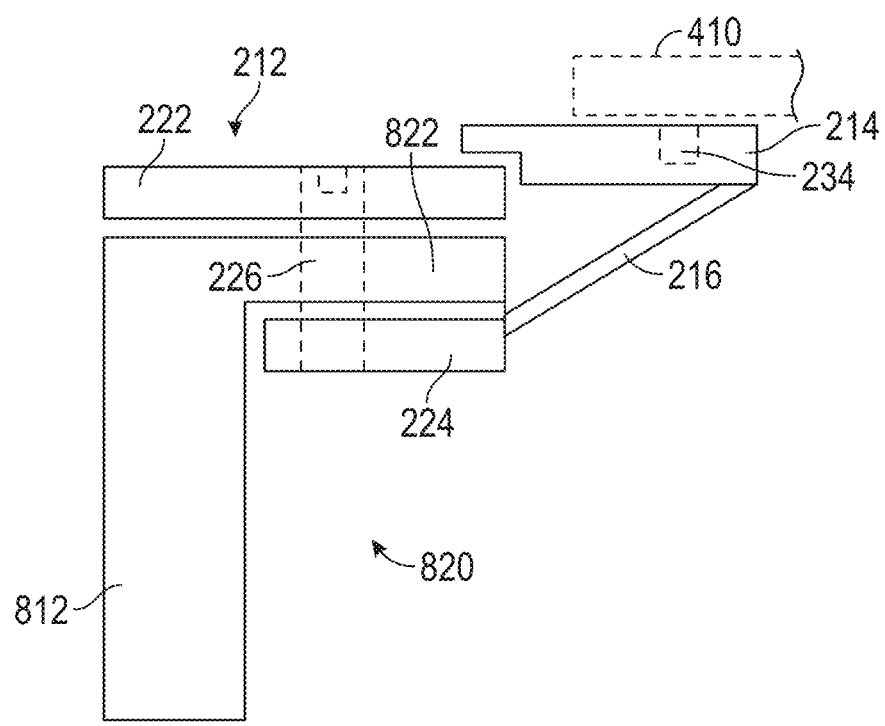
FIGS. 11A-11D are detail end views of embodiments of a support of the truck bed storage system.
Figure 11B:
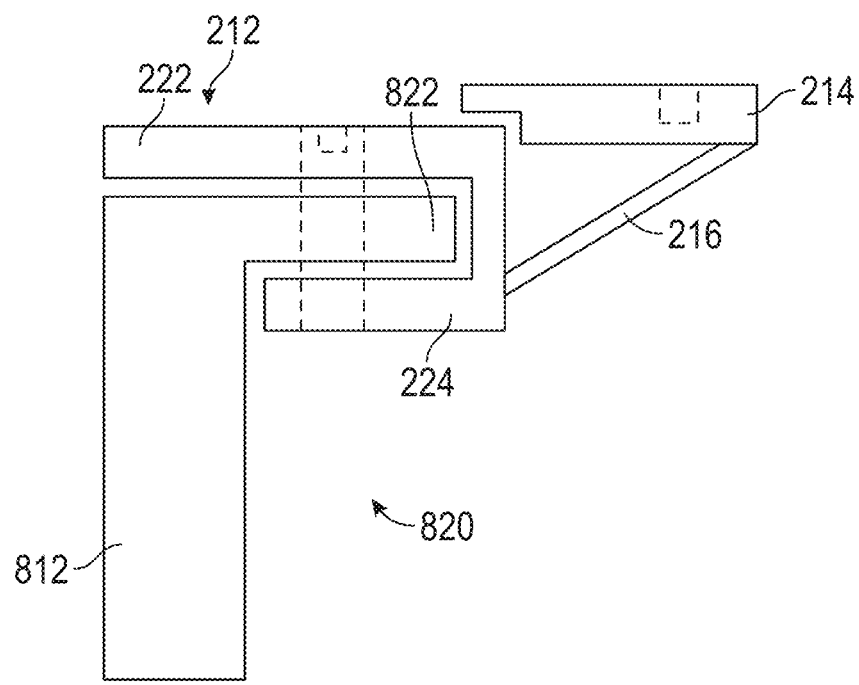

In other embodiments, elongated rail 212 may be unitarily formed and configured to wrap around ledge 822 of the side wall, as shown in FIG. 11B.

Elongated rail 212 may be fastened directly to the top of side wall 812 by connecting to a hole, slot, channel, or the like in the top of side wall 812. Elongated rail 212 may be directly bolted or screwed to a top 832 of side wall 812 (see FIG. 11D).

Support 210 may include a support extension 214 which may be retractably connected to elongated rail 212. As shown in FIGS. 10 & 11A, support extension 214 is located adjacent elongated rail 212 and projects toward the interior 820 of truck bed 800 when extended. Support extension 214 is configured to support cover 410. When retracted, as shown in FIG. 11C, support extension 214 may be positioned in a location away from the interior of truck bed 800.

The system includes one or more support extensions 214. Support extensions 214 are extensible to a combined dimension sufficient to accommodate the difference in size between the top of the assembled frame 110 (see FIG. 3) and the top of the truck bed (see FIG. 8). In this manner, a cover 410 sized to mount to the top of the frame may also be used as a bed cover.

In embodiments, the system may include two supports 210 each having a support extension 214. In another embodiment, the system may include two supports 210 where one support has a support extension 214 and the other does not. In some embodiments, supports 210 may be configured for attachment to the front or rear of the truck bed in a manner similar to the connection provided for connection of supports to the side walls. Such supports may also have a support extension 214, to accommodate a difference in length between the frame and bed cover configurations. In some embodiments, additional extensions may be included in the supports, in the cover, or as a separate part of the system.

Figure 11C:
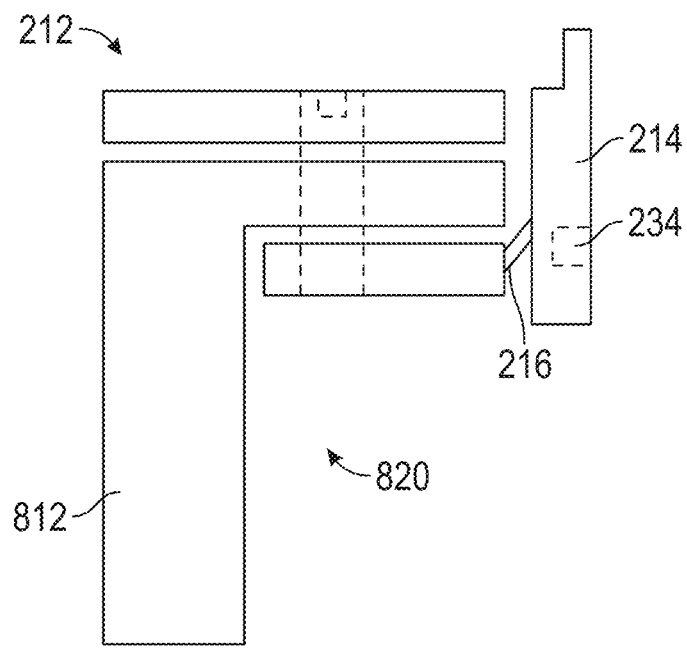
Figure 11D:
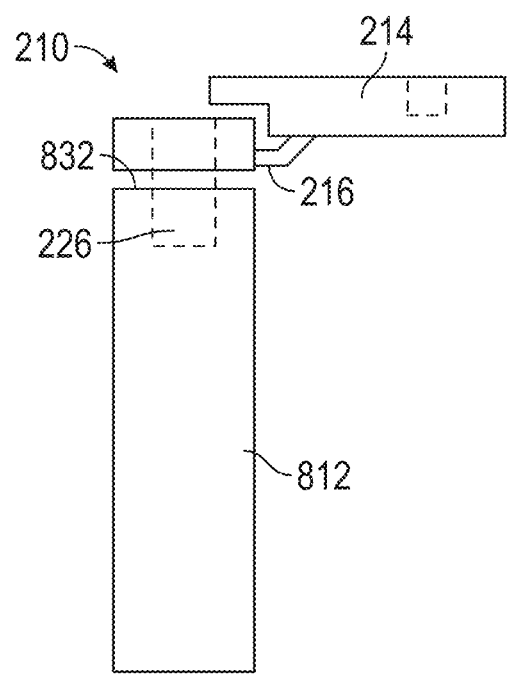

Support extension 214 may retract by folding on a foldable brace 216 or hinge-type mechanism, as shown in alternate positions in FIG. 11A (extended) and FIG. 11C (retracted). In other embodiments, support extension 214 may retract on an actuator such as a piston; support extension 214 may retract by sliding laterally above, beneath, or into elongated rail 212; or support extension 214 may be readily removable for storage when not in use. The retraction mechanism of support extension 214 may include a locking feature to resist undesired retraction or extension of the support extension.

Figure 12:
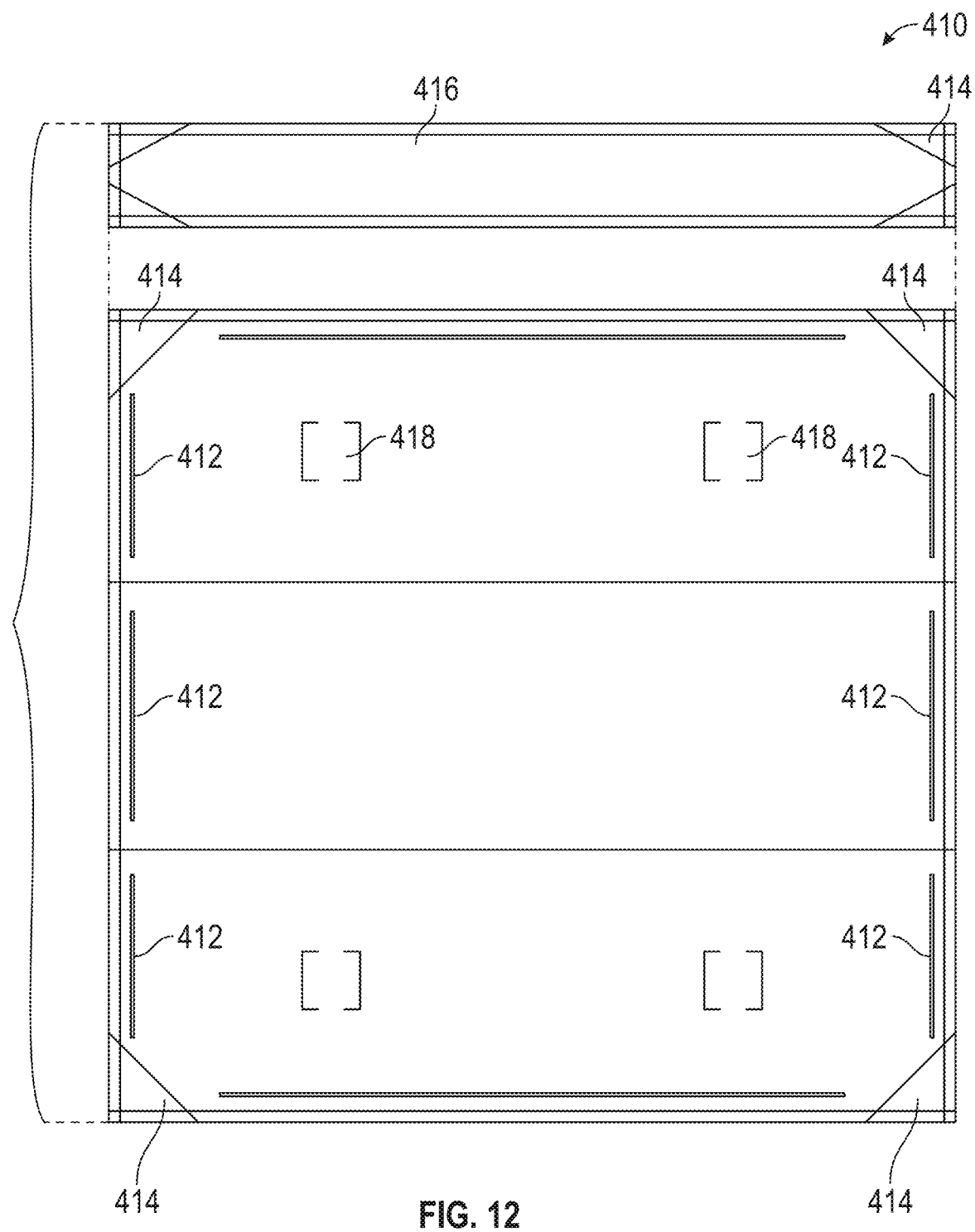
FIG. 12 is a bottom plan view of an embodiment of a cover of the system.

FIG. 12 is a bottom plan view of an embodiment of cover 410. In the shown embodiment, cover 410 includes a plurality of cover fasteners 412 each connectable to a corresponding cover fastener 234 on one of supports 210 (see FIG. 10). Exemplary embodiments of cover fasteners 412 and corresponding cover fastener 234 include: connectable clips, a hook and latch, or a resilient catch mechanism. In embodiments, cover fasteners 412 may be connectable in a similar manner to cover fasteners 130 of frame 110 (see FIG. 5), for use when the system is installed as a cap.

In embodiments, supplementary fasteners 414 may be included to provide additional security to cover 410. In FIG. 12, supplementary fasteners 414 are shown in each of the four corners of cover 410. Supplementary fasteners 414 may be connectable to frame 110 (e.g., in the top corners of frame 110). Examples of supplementary fasteners 414 may be an elastic cord, a strap, or a hook and loop type fastener. Cover 410 may include additional features such as accessory attachments 418, which may be located on the top or bottom surfaces of the cover. In one embodiment, cover 410 include accessory attachments for mounting a cross bar over the bed of the truck (above cover 410). In this configuration, the system includes a covered bed and a rack above the cover.

In embodiments, cover 410 may include an extensible section 416 disposed toward the front or rear of the cover and configured to increase the longitudinal dimension of cover 410 when cover 410 is in use as a bed cover. Extensible section 416 may, for example, be an insertable or slidable extension piece which may be removed or retracted when not in use. Extensible section 416 may be outwardly expandable in an accordion fashion. In embodiments, extensible section 416 may be removable for storage when not in use.

Referring again to FIGS. 6 & 7, frame 110 may be modular in that it may be readily assembled from and/or disassembled into a plurality of frame components or sections. For example, a first frame section may include an upper cross bar 111 and two legs 118. A second frame section may include a longitudinal bar 113. An example assembly of modular frame 110 may include two first frame sections (e.g., a front frame section 112 and a rear frame section 114) and two second frame sections (e.g., two side sections 116). As will be described below, other modular arrangements of frame 110 are possible, and such arrangements may include more or fewer than the components indicated in the present example.

Supports 210 are further configured for removable connection with the frame sections. In the shown embodiment, front frame section 112 and rear frame section 114 each have legs 118 which connect to supports 210. Legs 118 of frame 110 may be removably connected to supports 210 in any non-destructive manner, generally indicated as leg connection 128 which is removably connectable to corresponding leg connection 228 of the support.

In embodiments, legs may be removably connected to supports 210 by a single individual using hand tools, such as a wrench or driver. For example, legs 118 may have feet which are shaped and dimensioned to be received in a hole or sleeve of support 210. The feet may be retained in the supports with a bolt, pin, or other fastener. In another exemplary embodiment, legs 118 may terminate in a tongue configured to be received in a notch, slot, or groove of supports 210. The tongue may be retained with a bolt, pin, or other fastener. Legs 118 may mate to a support 210 by a twist and lock coupling or a slide and lock coupling. The coupling may have a quick-release type of locking mechanism.

Figure 7:
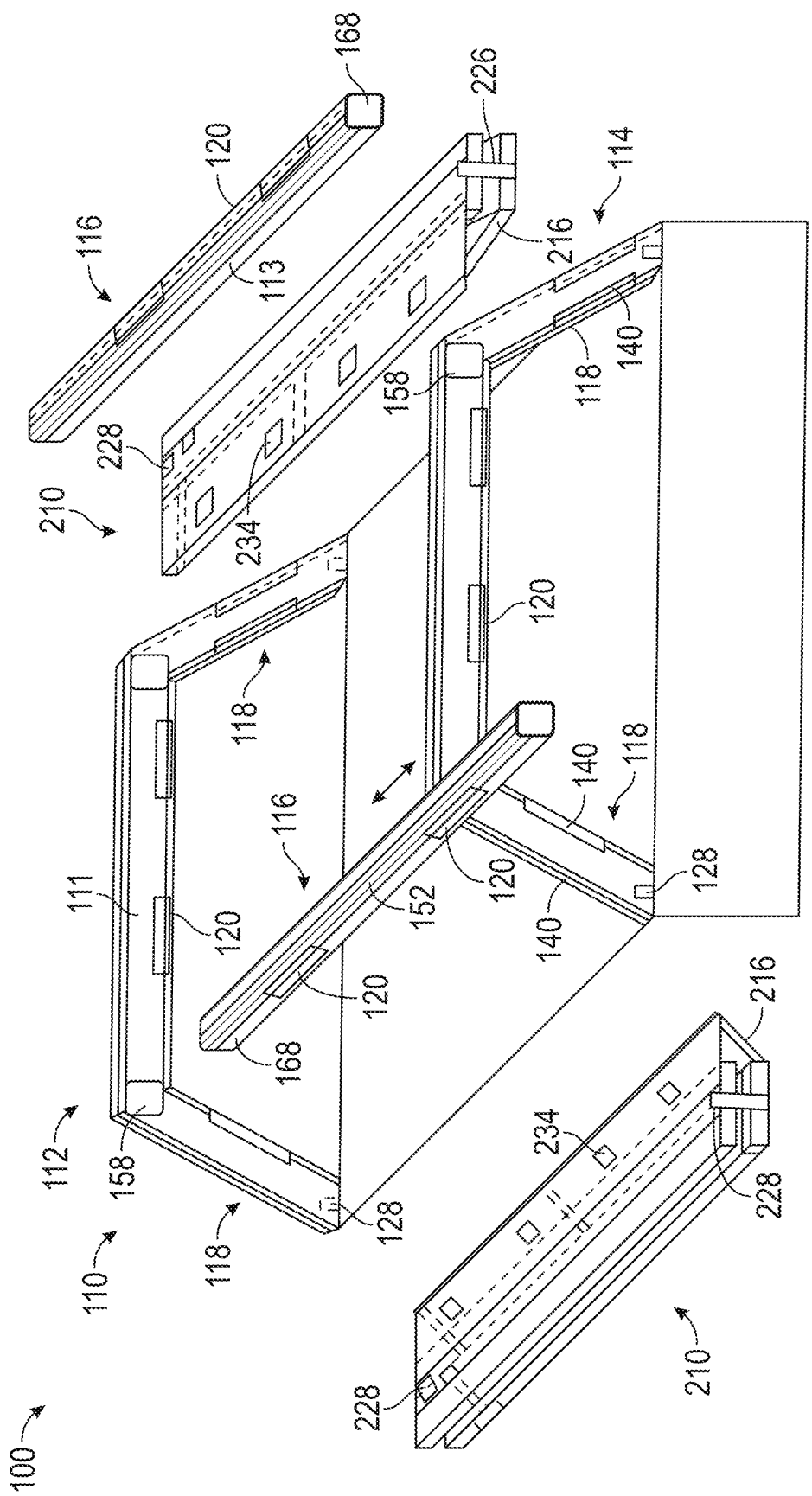
FIG. 7 is an exploded perspective view of an embodiment of the system in a rack configuration.

Two side frame sections 116 are present in the FIG. 7 embodiment. In this embodiment, each side frame section 116 is a longitudinal bar 113 which adjoins and interconnects front frame section 112 and rear frame section 114. Side frame sections 116 may have ends 168 which are configured to couple to the front and/or rear frame sections 112, 114, as indicated by frame coupling regions 158.

Figure 13A:
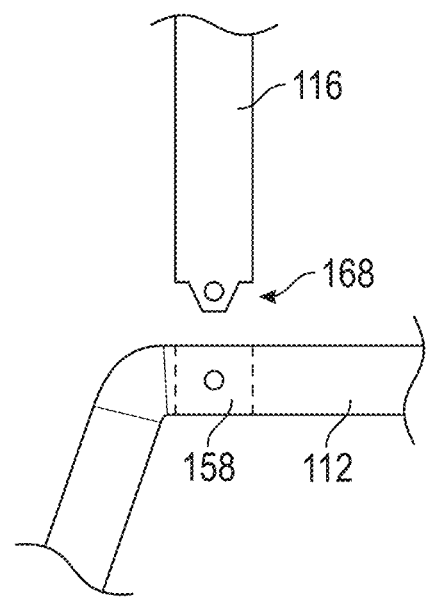
FIGS. 13A-13C are detail views of embodiments of area XIII of FIG. 5.
Figure 13B:
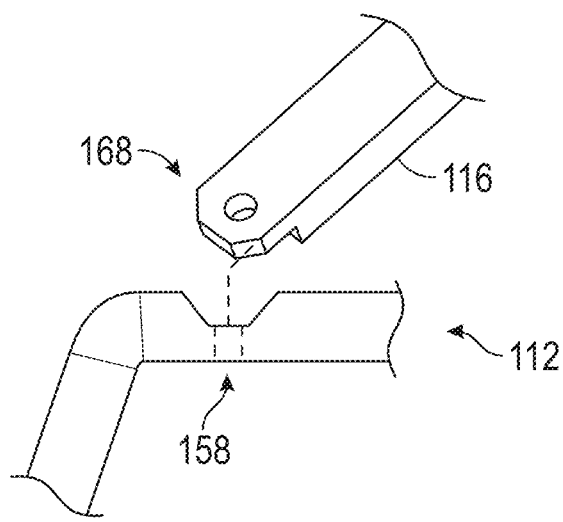
Figure 13C:
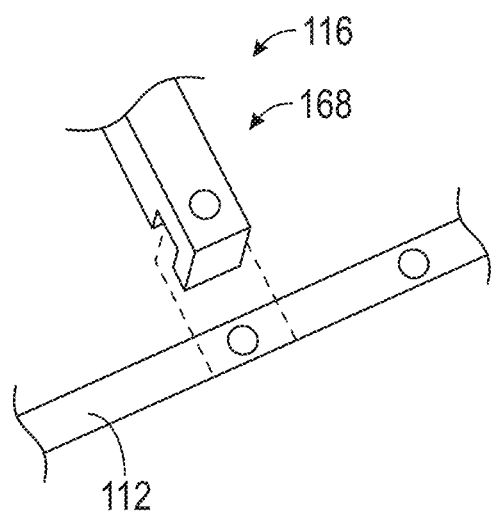

As shown in FIG. 13A, side frame section 116 may have an end 168 which is shaped and dimensioned to be received in a hole or sleeve in region 158 of front frame section 112. The opposing end of side frame section 116 may be similarly configured for connection to rear frame section 114. End 168 may be retained in the hole with a bolt, pin, or other fastener. As shown in FIG. 13B, side frame section 116 may have ends 168 which have a tongue configured to be received in a notch, slot, or groove in region 158 of the front and rear frame sections. The tongue may be retained with a bolt, pin, or other fastener. As shown in FIG. 13C, side frame section 116 may have ends 168 which are configured to partially surround the upper cross bars of the front and rear frame sections. The ends may be retained by clamping or fastening. The side frame sections may be adjustably positionable along the upper cross bars to vary a width of the rack.

In other embodiments, the two side frame sections 116 may have legs which connect to the supports. In such an embodiment, front frame section 112 and rear frame section 114 may be upper cross bars which join the side frame sections 116 to one another in a manner similar to the configurations discussed with reference to FIGS. 13A-13C. Said another way, frame 110 may include two first frame sections, each including an upper cross bar and two legs, that are configured to be mounted to the sides of the truck (side frame sections 116). Frame 110 may also include two second frame sections (e.g., front frame section 112 and rear frame section 114) that each include a longitudinal bar (configured for lateral orientation across the width of the truck bed). Frame 110 may be configured such that use of rear frame section 114 is optional; e.g. front frame section 112 and two side frame sections 116 may be installed without rear frame section 114. Frame 110 may alternatively be configured to include front frame section 112 without side frame sections 116 or rear frame section 114, in a configuration commonly referred to as a "headache" rack. In the headache rack configuration a first frame section (e.g., front frame section 112 of FIG. 7) may be configured to be connected to the truck bed without being attached to any other components of the frame. The first frame section may further cooperate with a grill, rails, or additional accessory supporting hardware which may be included in a storage system kit or may be provided as an optional add-on. The first frame section may be load-bearing. For example, the first frame section may be designed to carry at least a 35 lb load, at least a 150 lb load, or more. The grill or other hardware may be connected to or inserted within the center of the front frame section, and may be fastened thereto.

Figure 14:
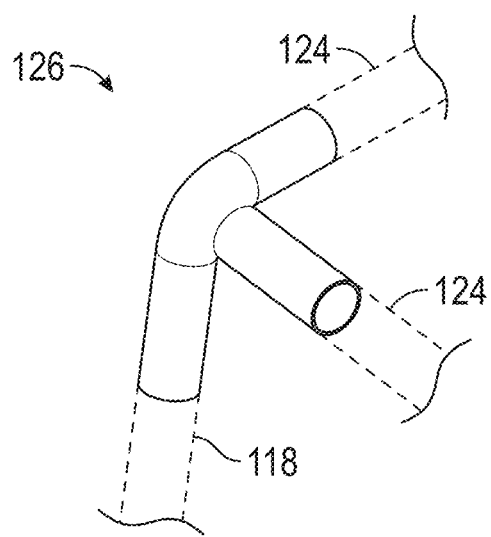
FIG. 14 is a detail view of an embodiment of area XIV of FIG. 5.
Figure 19:
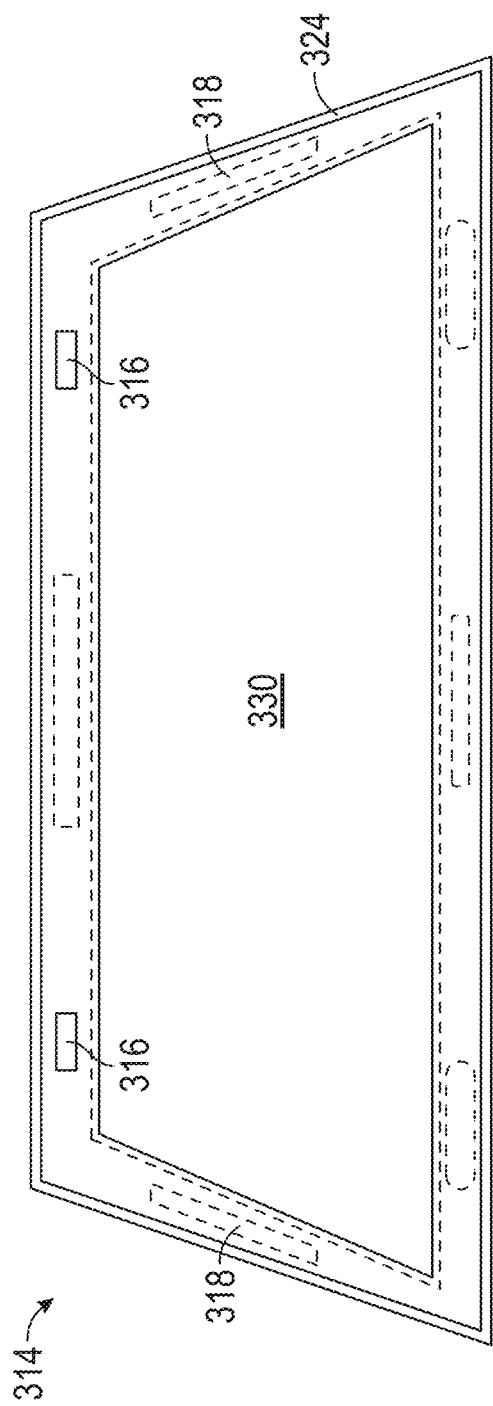
FIG. 19 is an exterior side view of an embodiment of a front panel of the system.
Figure 20:
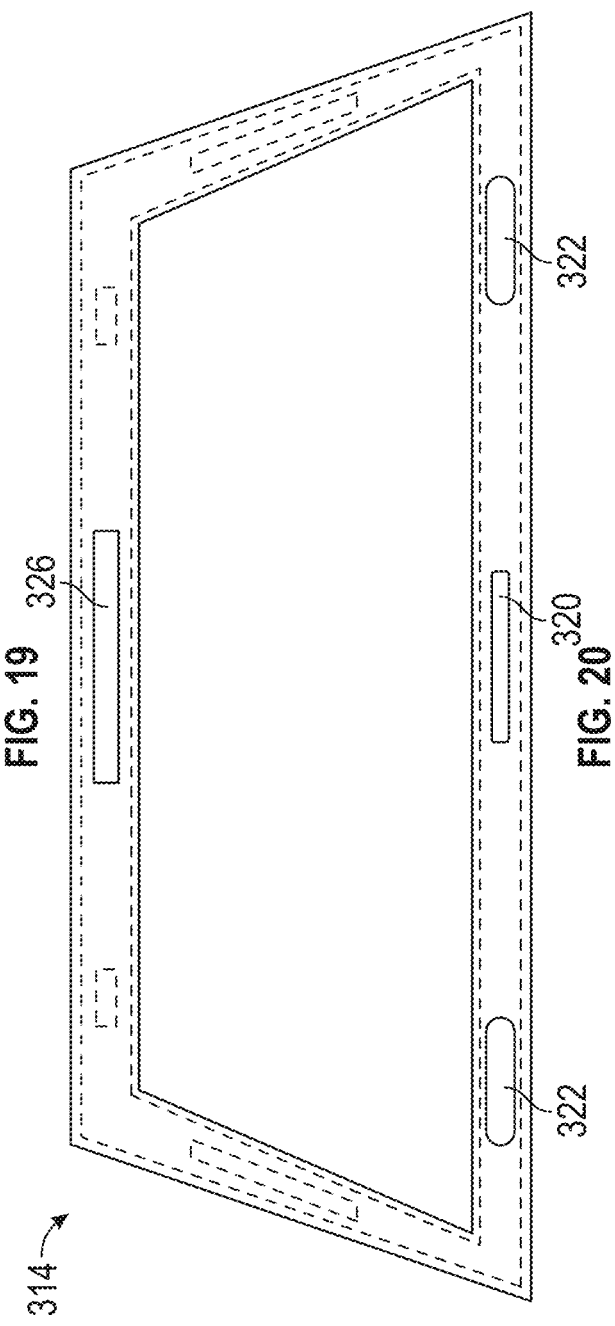
FIG. 20 is an interior side view of an embodiment of a front panel of the system.

In some embodiments, frame 110 may have four legs 118 which may be removably connectable from four upper frame members 124. Legs 118 may directly couple to upper frame members 124. Alternatively, a frame joint 126 may be used to couple leg 118 with upper frame members 124. FIG. 14 illustrates an exemplary embodiment of a frame joint 126. The connection between legs or upper frame members and frame joint 126 may include a resilient button, a ferrule, or other mechanism to improve the retention or release of the connection to frame joint 126.

In another embodiment, frame 110 is unitarily formed and includes four legs 118 and four upper frame members 124. In another embodiment, a first frame section may be unitarily formed, including an upper cross bar and two legs.

Upper frame members 124 may be adapted for additional configurations of frame 110 or configured to support accessories. For example, a hole pattern may be provided in an upper frame member 124 for mounting accessories to the upper frame member. Examples of connectable accessories include cargo supports, such as for a canoe or ladder; cargo restraints, such as a buckle or strap; and configurable storage components. In some embodiments, connectable accessories may be packaged with the truck bed storage system as a kit.

In some embodiments, a portion of frame 110 may be adjustably positionable along a length of supports 210. As shown in side frame sections 116 of FIG. 7, a channel 152 or track may be provided for slidably connecting a crossbar between two side frame sections 116. In embodiments which include channel 152, either of front frame section 112 or rear frame section 114 may be adjustably positionable along the length of side frame sections 116 (for example, rear frame section 114 may be adjustable along the directional arrow of FIG. 7). This configuration may be applied, mutatis mutandis, to provide side frame sections which are adjustably positionable along the width of front and rear frame sections 112, 114.

Figure 21:
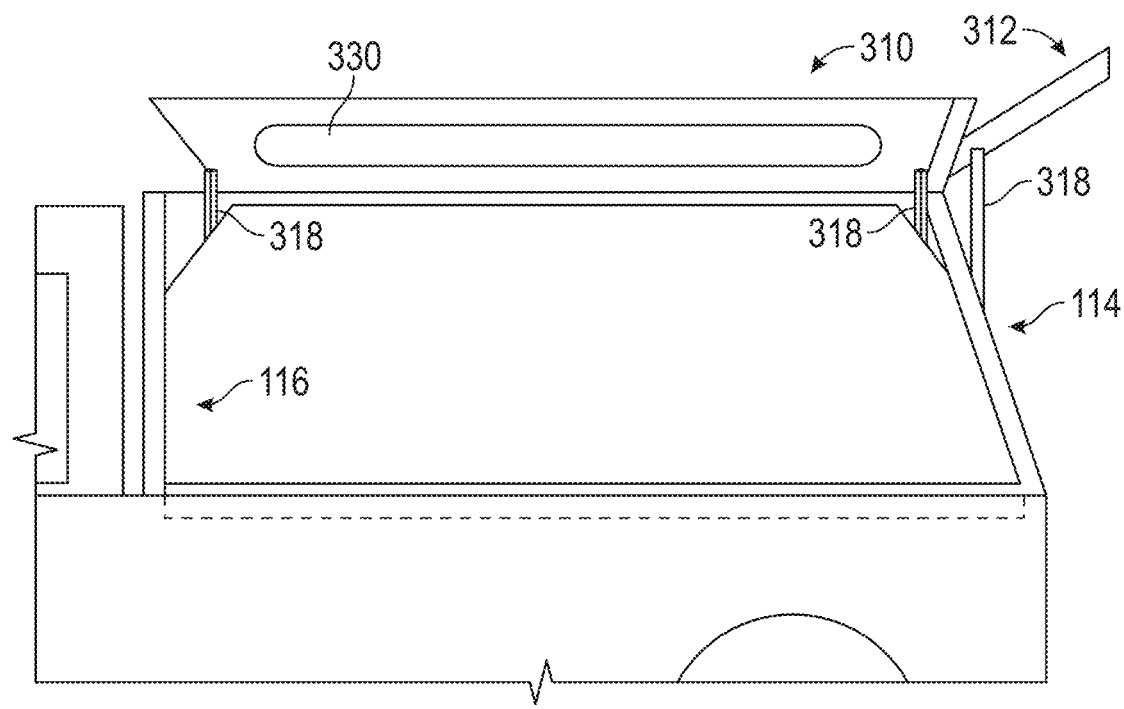
FIG. 21 is a side view of an embodiment of the truck bed storage system in another use configuration.

Front frame section 112 may have a substantially vertical orientation when connected to the truck bed, as shown in FIG. 21. The front frame section may be angled inwardly, toward the center of the truck bed, as shown in FIG. 3. The rear frame section may be angled inwardly, toward the center of the truck bed, as shown in FIGS. 1 & 3. In some embodiments, legs 118 of at least one of the two first frame sections are angled inwardly.

Rail-shaped components of frame 110 may be shown in the figures having a substantially circular or square-shaped cross-section; however, other cross-sectional shapes may be readily envisioned to achieve an equivalent result. Furthermore, the overall shape of any of the frame sections may vary from embodiments shown, such as may be desired, for example, for aesthetic or aerodynamic reasons.

Referring now to FIGS. 15-20, there are shown exterior and interior side views of embodiments of a side panel 310, a rear panel 312, and a front panel 314 of the system. In a typical embodiment, system 100 includes two of side panel 310 (e.g., for use on either the left or right side of the truck bed) and one each of rear panel 312 and front panel 314 (see also FIG. 3). Each of panels 310, 312, 314 are removably connectable to a side of assembled frame 110. Each of the panels may be, for example, removably connectable to either an upper cross bar or a longitudinal bar of the frame. One or more of the panels may slide in to the assembled frame 110; for example a panel may slidingly engage with the frame by insertion at the top and sliding positioning from top to bottom, or a side panel 310 may slidingly engage with the frame by insertion from the rear and sliding positioning from rear to front.

In embodiments, the panels may have a latch 316, such as a tongue or hook configured to be retained by a corresponding keeper 120 in a frame section where the panel is to be mounted (see, e.g., side frame section 116 of FIG. 7). Example latching mechanisms for panels 310, 312, and 314 include turn latches, push to close latches, draw latches, and cam locks.

In embodiments, the panels may have an actuator, such as a piston 318, configured to raise or lower the panels. FIG. 21 shows an embodiment of system 100 configured as a cap with panels 310, 312 shown in a raised position. One end of each piston 318 is connectable to a frame section (rear frame section 114 and side frame section 116 are shown). The ends of the pistons may be removably connectable to the frame sections, such as in piston region 140 (see FIG. 7). The pistons may be retained with the panels when not in use, or may be stored in a frame section or another location.

Panels 310, 312, and 314 may include a window or transparent viewing pane 330. All or a portion of pane 330 may be slidingly positionable to provide ventilation (e.g., along the directional arrow of FIG. 15). The panels may include other features such as one or more handles 320, one or more locks 322, a weatherproof seal 324, a light 326, or a camera 328. The panels may be rigid or may be semi-rigid. For example, a semi-rigid panel may include a rigid border and a flexible center. Rigid portions of the panel may support elements used for connecting, positioning, or locking the panel.

Figure 22:
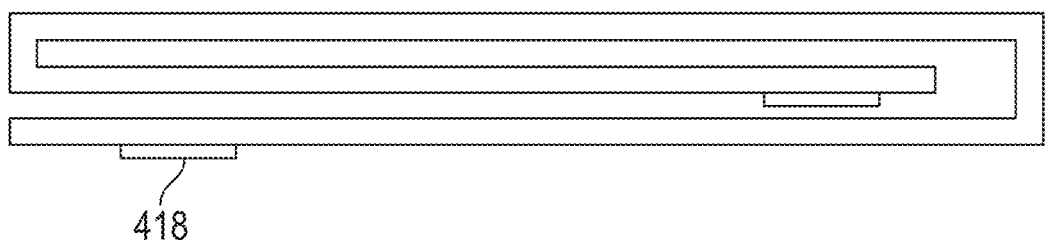
FIG. 22 is an end view of an embodiment of the cover in a folded position.

In embodiments, all or parts of the system may be configured for compact storage when not installed on a vehicle. For example, cover 410 may be folded when uninstalled, as shown in FIG. 22. In other embodiments, cover 410 may be configured to be rolled into a tube-like shape when not in use.

Figure 23:
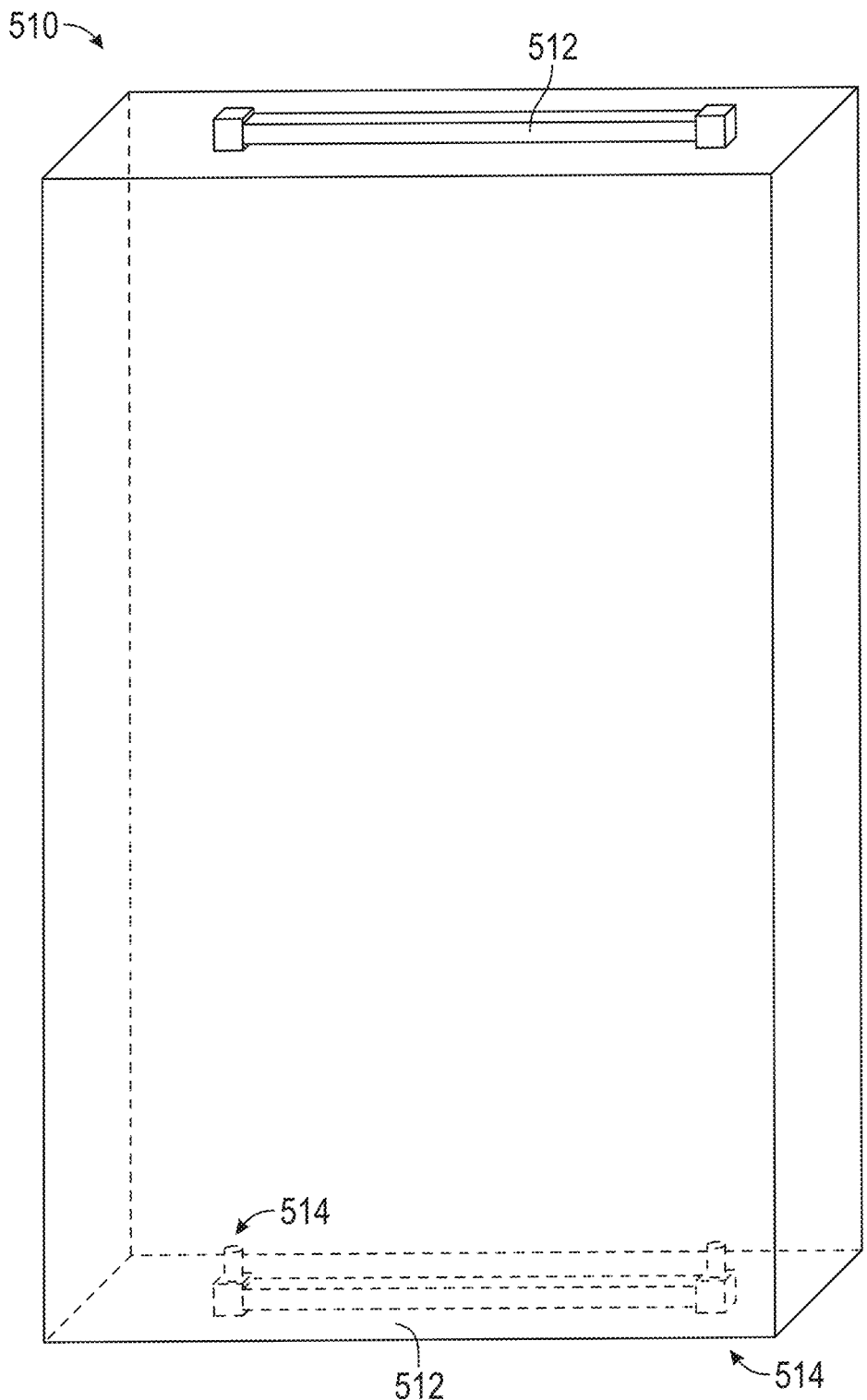
FIG. 23 is a perspective view of an embodiment of a carrying case.

FIG. 23 shows an embodiment of a carrying case 510 configured for storing all or a portion of system 100. One or more handles 512 (two shown in the present embodiment) may be included on carrying case 510 for ease of lifting. Carrying case 510 may be formed of a rigid or flexible material, may include internal pockets or straps for organizing stored parts, and may include wheels 514.

Elements of the system, such as the frame sections or supports, may be formed of powder coated aluminum, steel, or a high-strength plastic material. Elements of the system, such as the panels or cover, may be formed of polyethylene. Elements of the system, such as windows in the panels, may be formed of glass or acrylic.

The system may include additional features not specifically recited above, such as interior or exterior lights, handles, locks, weather-sealing, a security alarm, a camera, etc.

In terms of use, a method of storing cargo in a cooperating truck bed having side walls and a length from front to rear, the method includes (refer to FIGS. 1-23):

a) providing a storage system 100 including:
        i) one or more supports 210 configured to connect to the side walls 812 of the truck bed 810 and extend along the length of the truck bed;
        ii) a modular frame 110 configured for connection to the one or more supports, the frame configurable to a first assembled position having four sides 122 and a top;
        iii) one or more panels (e.g., 310, 312, 314), each of the panels removably connectable to one of the four sides of the frame when the frame is in the first assembled position; and
        iv) a cover 410 being removably attachable to the top of the frame when the frame is in the first assembled position, and the cover being removably attachable to the one or more supports without being attached to the frame; and b) installing the storage system in a cap configuration by:
  v) connecting the one or more supports to the truck bed;
  vi) connecting the modular frame to the one or more supports in a first assembled position;
  vii) connecting each of the one or more panels to one of the four sides of the frame when the frame is in the first assembled position;
  viii) attaching the cover to the top of the frame when the frame is in the first assembled position;
c) installing the storage system in a rack configuration by:
  ix) connecting the one or more supports to the truck bed;
  x) connecting the modular frame to the one or more supports in a first assembled position;
d) installing the storage system in a cover configuration by:
  xi) connecting the one or more supports to the truck bed;
  xii) attaching the cover to the one or more supports without attaching the cover to the frame; and
e) storing cargo in the storage system.

The method further including: installing the storage system in a headache rack configuration by connecting a first frame section to the truck bed without the first frame section being attached to other components of the frame, the first frame section including an upper cross bar 111 and two legs 118.

The method further including: after vii), removing at least one of the one or more panels from one of the four sides of the frame.

The method further including: positioning at least a portion of the frame along a length of the one or more supports.

The embodiments of the truck bed storage system and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the system and method should be construed as limiting the invention to a particular embodiment or combination of embodiments. The scope of the invention is defined by the appended claims.

I claim:

1. A storage system for a cooperating truck bed having side walls and a length from front to rear, the storage system comprising:
  one or more supports configured to connect to the side walls of the truck bed and extend along the length of the truck bed, each of the supports further configured to connect to at least one of the front of the truck bed and the rear of the truck bed;
  a modular frame configured for connection to the one or more supports, the frame including a front frame section, a rear frame section, and two side frame sections each including a longitudinal bar, the frame configurable to a first assembled position having four sides and a top;
  one or more panels, each of the panels removably connectable to one of the frame sections when the frame is in the first assembled position;
  a cover being removably attachable to the top of the frame when the frame is in the first assembled position, and the cover being removably attachable to the one or more supports without being attached to the frame; and
  wherein the storage system is positionable into at least two configurations selected from the group of configurations including:
    a cap including the frame configured in the first assembled position, the cover attached to the top of the frame, and the one or more panels each connected to one of the frame sections;
    a rack including the frame configured in the first assembled position;
    a headache rack including the front frame section configured to be load-bearing without being attached to any of the side frame sections or the rear frame section; and
    a bed cover including the one or more supports and the cover attached to the one or more supports.

2. The storage system of claim 1, wherein each longitudinal bar is configured to adjoin and interconnect the front frame section and the rear frame section.

3. The storage system of claim 1, wherein the one or more supports are configured to connect to the top of the side walls of the truck bed.

4. The storage system of claim 1, wherein the front frame section and the rear frame section are each configured for removable connection to the supports.

5. The storage system of claim 1, wherein the one or more supports include an elongated rail configured to extend substantially along the entire length of the truck bed.

6. The storage system of claim 1, wherein the cover includes a slidable extension piece configured to increase a dimension of the cover.

7. The storage system of claim 1, wherein at least a portion of the frame is adjustably positionable along a length of the one or more supports.

8. The storage system of claim 1, wherein the frame includes one or more longitudinal bars and each of the one or more longitudinal bars are unitarily formed.

9. The storage system of claim 1, wherein the one or more panels are rigid.

10. A storage system for cooperation with a truck bed having side walls and a length from front to rear, a cover, and one or more panels, the storage system comprising:
  one or more supports configured to connect to the side walls of the truck bed and extend along the length of the truck bed, each of the supports further configured to connect to at least one of the front of the truck bed and the rear of the truck bed;
  a modular frame configured for connection to the one or more supports, the frame including a front frame section, a rear frame section, and two side frame sections each including a longitudinal bar, the frame configurable to a first assembled position having four sides and a top;
  wherein, when the frame is in the first assembled position, the frame is configured for removable connection of the one or more panels to one of the frame sections and removable connection of the cover to the top of the frame;
  wherein, the supports are configured for removable connection of the cover thereto; and
  wherein the frame is positionable into at least two configurations including:
    a rack including the frame configured in the first assembled position; and
    a headache rack including the front frame section configured to be load-bearing without being attached to any of the side frame sections or the rear frame section.

11. The storage system of claim 10, wherein each longitudinal bar is configured to adjoin and interconnect the front frame section and the rear frame section.

12. The storage system of claim 10, wherein the one or more supports are configured to connect to the top of the side walls of the truck bed.

13. The storage system of claim 10, wherein the front frame section and the rear frame section are each configured for removable connection to the supports.

14. The storage system of claim 10, wherein the cover includes a slidable extension piece configured to increase a dimension of the cover.

15. The storage system of claim 10, wherein at least a portion of the frame is adjustably positionable along a length of the one or more supports.

16. A storage system for a cooperating truck bed having side walls and a length from front to rear, the storage system comprising:
   one or more supports configured to connect to the side walls of the truck bed;
   a modular frame configured for connection to the one or more supports, the frame configurable to a first assembled position having four sides and a top;
   one or more panels, each of the panels removably connectable to one of the four sides of the frame when the frame is in the first assembled position;
   a cover being removably attachable to one or more of: the supports, the truck bed, and the frame when the frame is in the first assembled position; and
   wherein the storage system is positionable into at least three configurations, the configurations including:
      a cap including the frame configured in the first assembled position and the one or more panels each connected to one of the four sides of the frame;
      a rack including the frame configured in the first assembled position and connected to the one or more supports; and
      a bed cover including the one or more supports and the cover attached to one or more of: the supports, the truck bed, and the frame.

17. The storage system of claim 16, wherein the modular frame includes two first frame sections and two second frame sections, each of the two first frame sections including an upper cross bar and two legs, and each of the two second frame sections including a longitudinal bar.

18. The storage system of claim 17, wherein the legs of at least one of the two first frame sections are angled inwardly.

19. The storage system of claim 16, wherein each of the one or more panels is removably connectable to at least one of: an upper cross bar and a longitudinal bar of the frame.

20. The storage system of claim 16, wherein the frame configured in the first assembled position is designed to support at least 150 lbs.

\* \* \* \* \*